(12) United States Patent
Thomas

(10) Patent No.: US 8,890,546 B2
(45) Date of Patent: Nov. 18, 2014

(54) APPARATUS AND METHOD FOR DIGITISING IMPEDANCE

(75) Inventor: David Kenneth Thomas, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 505 days.

(21) Appl. No.: 13/203,889

(22) PCT Filed: Mar. 1, 2010

(86) PCT No.: PCT/GB2010/000363
§ 371 (c)(1),
(2), (4) Date: Aug. 30, 2011

(87) PCT Pub. No.: WO2010/103258
PCT Pub. Date: Sep. 16, 2010

(65) Prior Publication Data
US 2011/0316566 A1    Dec. 29, 2011

(30) Foreign Application Priority Data

Mar. 11, 2009  (GB) .................................. 0904180.7

(51) Int. Cl.
*G01R 27/26* (2006.01)
*G01D 5/24* (2006.01)

(52) U.S. Cl.
CPC ...................................... *G01D 5/24* (2013.01)
USPC ............................ 324/683; 324/663; 324/667

(58) Field of Classification Search
USPC .................... 324/663, 667, 671, 683
See application file for complete search history.

(56) References Cited

U.S. PATENT DOCUMENTS

| 4,467,271 A | * | 8/1984 | Ruckenbauer et al. ....... 324/727 |
| 4,719,538 A | | 1/1988 | Cox |
| 5,006,952 A | | 4/1991 | Thomas |
| 5,175,763 A | * | 12/1992 | Gazsi ............................. 379/402 |

(Continued)

FOREIGN PATENT DOCUMENTS

| CN | 101118150 A | 2/2008 |
| EP | 0 239 337 A1 | 9/1987 |

(Continued)

OTHER PUBLICATIONS

Chinese Office Action issued in Chinese Patent Application No. 201080011499.6 on Sep. 11, 2013 (with translation).

(Continued)

*Primary Examiner* — Vincent Q Nguyen
(74) *Attorney, Agent, or Firm* — Oliff PLC

(57) ABSTRACT

An apparatus for digitizing an impedance is provided that comprises a first impedance element having a first impedance that varies with a property to be measured and a second impedance element having a second impedance. The apparatus also includes a drive signal generator for applying a first alternating drive signal to the first impedance element and a second alternating drive signal to the second impedance element. An analog-to-digital converter, ADC, receives a resultant signal comprising the combination of the signals produced by the application of the first and second alternating drive signals to the first and second impedance elements. The first alternating drive signal is phase shifted relative to the second alternating drive signal such that the resultant signal received and sampled by the ADC sequentially relates to the sum of, and the difference between, the first and second impedances. The apparatus also comprises a signal separator that receives sample values from the ADC and generates a sum channel and a difference channel therefrom.

13 Claims, 5 Drawing Sheets

(56) References Cited

U.S. PATENT DOCUMENTS

Figure 1:
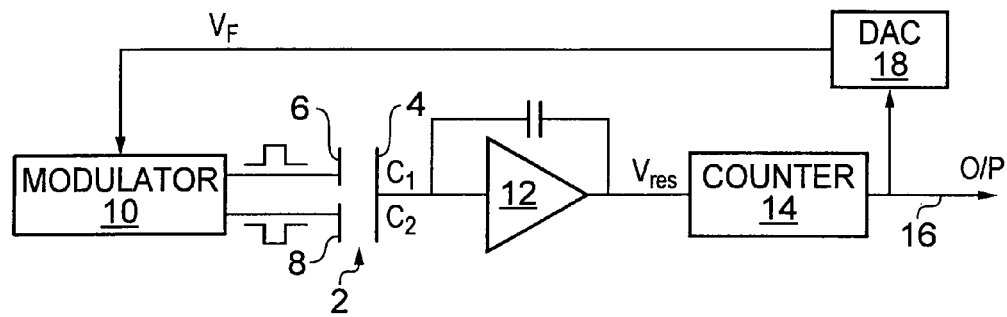

| | | | |
|---|---|---|---|
| 5,705,978 | A | 1/1998 | Frick et al. |
| 5,812,427 | A | 9/1998 | Nonoyama et al. |
| 6,586,943 | B1 | 7/2003 | Masuda et al. |
| 2007/0024274 | A1 | 2/2007 | Riedel et al. |
| 2008/0204049 | A1 | 8/2008 | Kawate et al. |

FOREIGN PATENT DOCUMENTS

| | | |
|---|---|---|
| EP | 0 578 906 A2 | 1/1994 |
| EP | 1 072 865 A2 | 1/2001 |
| GB | 1 366 284 | 9/1974 |
| JP | A-2-504079 | 11/1990 |
| JP | A-8-297147 | 11/1996 |
| JP | A-2001-33330 | 2/2001 |
| JP | A-2003-42879 | 2/2003 |
| WO | WO 89/09927 A1 | 10/1989 |
| WO | WO 02/061378 A1 | 8/2002 |
| WO | WO 2009/011473 A1 | 1/2009 |

OTHER PUBLICATIONS

Japanese Office Action issued in Japanese Patent Application No. 2011-553502 on Jul. 23, 2013 (with translation).

International Search Report issued in International Application No. PCT/GB2010/000363 on Aug. 13, 2010.

Written Opinion of the International Searching Authority issued in International Application No. PCT/GB2010/000363 on Aug. 13, 2010.

British Search Report issued in British Application No. GB0904180.7 on Jun. 12, 2009.

Jun. 19, 2014 Office Action issued in Chinese Patent Application No. 201080011499.6 (with translation).

\* cited by examiner

APPARATUS AND METHOD FOR DIGITISING IMPEDANCE

The present invention relates to an apparatus and method for digitising impedance, and in particular to digitising the capacitance of a displacement responsive differential capacitive transducer.

Many different types of transducer are known that have an impedance that varies in relation to a property or quantity to be measured. For example, a measurement probe that incorporates differential capacitive transducers for measuring displacement is described in WO02/061378. Various closed loop conditioning circuits are also known for converting the impedance of such transducers to a digital output value that is related to impedance. An example of such a circuit for use with multiple capacitive displacement transducers is described in WO89/09927.

In one embodiment of WO89/09927, three differential capacitive transducers are driven by square waves of three different frequencies that are generated by associated drive signal modulators. The signals produced by each of the differential capacitive transducers when driven by the respective square waves are applied to the common input of a charge amplifier. The output of the charge amplifier is demodulated by three phase sensitive rectifiers that are each driven at one of the square wave drive frequencies. Each of the phase sensitive rectifiers thus produces an output that indicates any current imbalance associated with the driving of its associated differential transducer. A closed loop feedback circuit is provided for each of the differential capacitive transducers; this responds to any measured current imbalance for the respective transducer and feeds a voltage signal back to the corresponding drive signal modulator that tends to null the input to the charge amplifier. Each feedback voltage signal is generated, using a separate digital-to-analogue converter, from the digital output of a counter that also provides the digitised transducer output.

According to a first aspect of the present invention, apparatus for digitising an impedance is provided that comprises;
  a first impedance element having a first impedance that varies with a property to be measured,
  a second impedance element having a second impedance,
  a drive signal generator for applying a first alternating drive signal to the first impedance element and a second alternating drive signal to the second impedance element, and
  an analogue-to-digital converter (ADC) for receiving and digitising a resultant signal, the resultant signal comprising the combination of the signals produced by the application of the first and second alternating drive signals to the first and second impedance elements,
  wherein the first alternating drive signal is phase shifted relative to the second alternating drive signal such that the resultant signal received and sampled by the analogue-to-digital converter sequentially relates to the sum of, and the difference between, the first and second impedances,
  characterised in that the apparatus comprises a signal separator that receives sample values from the ADC and provides a sum channel and a difference channel, the sum channel comprising a series of values relating to the sum of the first and second impedances and the difference channel comprising a series of values relating to the difference between the first and second impedances.

The present invention thus provides an open loop circuit for digitising the first impedance of a first impedance element, the first impedance being variable in relation to a property (e.g. displacement) that is to be measured. As outlined in more detail below, the second impedance may also be variable in relation to the property (e.g. displacement) that is to be measured or it may be substantially invariant with that property. The drive signal generator applies first and second alternating drive signals, such as a pair of quadrature phase square waves, to the first and second impedance elements. The signals resulting from driving the first and second impedances are combined (optionally with one or more further signals as described below) and the resultant signal is sampled by the ADC.

The first and second alternating drive signals are phase shifted relative to each other. The application of phase shifted drive signals, such as quadrature phase square waves, to the first and second impedances allows information on the sum and difference of those impedances to be extracted from the samples of the resultant signal taken by the ADC. In particular, the resultant signal received and sampled by the analogue-to-digital converter sequentially relates to the sum of, and the difference between, the first and second impedances. The ADC can thus produce a series of sample (i.e. digital) values that relate to either sum or difference values. For example, the ADC may be appropriately clocked in synchronisation with the first and second alternating drive signals to output one or more digital sample values representing the sum and difference of the first and second impedances in turn.

The apparatus also comprises a signal separator that receives the (digital) sample values from the ADC and generates a sum channel and a difference channel. The signal separator may comprise a phase sensitive detector (PSD) arrangement and may also receive the first and second drive signals. The sum channel or data stream may comprise a series of values relating to the sum of the first and second impedances. The difference channel or data stream may comprise a series of values relating to the difference between the first and second impedances. The signal separator may be arranged to include repeated values in the sum and/or difference channels; e.g. to ensure a constant stream of data bits can be supplied to an associated filter. If the sum and/or difference values are of different signs (e.g. take negative and positive values) one sign of values may also be inverted as necessary. The values contained in the sum and difference channels may be processed to derive information on changes in the relative values of the first and second impedances. As described below, this information can be used to provide a reliable measurement of a property (e.g. displacement) that is to be measured.

The open loop configuration of the present invention has been found to mitigate at least some of the disadvantage of the prior art, closed loop, systems mentioned above. For example, the present invention uses an ADC that will typically introduce less noise and have a lower power consumption than the DACs of prior art systems. The open loop arrangement also does not, unlike prior art closed loop systems, need a certain time to settle down after being activated and can thus be activated only when required thereby saving further power.

A divider may also be advantageously provided in combination with the signal separator to divide values in the difference channel by values in the sum channel thereby producing a stream of output values. The output values may thus relate to the ratio of the difference between the first and second impedances and the sum of the first and second impedances. Advantageously, the values contained in the sum and difference channels are aligned such that each division is unique.

The apparatus preferably comprises at least one digital filter. If the output rate of measurements from the apparatus is not critical, the digital filter may implement decimation sampling. For example, a plurality of sum and difference sample values generated by the ADC may be collected and averaged by the digital filter to generate an output value. If a signal separator is provided to produce sum and difference channels as described above, the at least one digital filter may be located before or after the divider that is used to combine such channels. The at least one digital filter may comprise a finite impulse response (FIR) digital filter. This may be applied to the stream of difference/sum values generated by a divider of the type mentioned above. Digital filtering, optionally combined with ADC over-sampling, may also be used to improve the signal-to-noise performance of the apparatus.

The drive signal generator may be of any suitable type. The first and second alternating drive signals applied to the first and second impedances may take any form. For example, the first and/or second alternating drive signals may comprise square waves, sinusoidal waveforms, triangular waves etc. Preferably, the form of the first alternating drive signal is substantially the same as the form of the second alternating drive signal. Preferably, the ratio of the amplitudes of the first and second alternating drive signals is approximately or substantially constant during use. Advantageously, the amplitude of the first alternating drive signal is approximately or substantially the same as the amplitude of the second alternating drive signal. As mentioned above, the second alternating drive signal is phase shifted relative to the first alternating drive signal and it is preferred that the phase shift between the first and second alternating drive signals is approximately or substantially invariant during use. Advantageously, the second alternating drive signal is phase shifted by substantially 90° relative to the first alternating drive signal; i.e. it is preferred that the first and second alternating drive signals are in quadrature phase. The first and second alternating drive signals, or timing signals generated therefrom, may also be passed to the signal separator for use in the process of separating the sum and difference values into the sum and difference streams using phase sensitive detection.

The various signals used within the apparatus (e.g. the alternating drive signals and/or the signals used for any phase sensitive detection) may be derived from a single source. For example, the apparatus may comprise a master oscillator. The drive signal generator may include the master oscillator or may have an input for receiving a clock signal from such a master oscillator.

Preferably, the apparatus comprises a differential transducer that includes the first and second impedance elements. Both the first impedance and the second impedance may then vary with the property (e.g. displacement) to be measured. In such an arrangement, the first and second impedance elements may include separate inputs for receiving the first and second alternating drive signals and a common pick-up electrode or sensor output.

The present invention can, however, also be applied to so-called single-ended transducers by providing a separate, e.g. substantially invariant, second impedance. In such an example, a transducer may be provided that includes the first impedance element. The second impedance element may then be separate from the transducer; for example, the second impedance element may have a second impedance that is invariant with the property measured by the transducer.

The apparatus may be used to digitise any type of impedance; e.g. inductance, resistance or capacitance. Preferably, the first impedance element has only one impedance component that varies in relation to the property to be measured. Advantageously, the first and second impedance elements comprise first and second capacitive elements. For example, the capacitive elements may form part of a displacement transducer, such as those described previously in WO89/09927 and WO02/061378.

The apparatus preferably comprises a charge amplifier. The charge amplifier conveniently has a common input for receiving a signal from each of the first and second impedance (e.g. capacitive) elements and produces therefrom a resultant signal that is supplied to the ADC. The charge amplifier may comprise a feedback impedance (e.g. a feedback capacitance).

The apparatus may include a first impedance element that forms part of a transducer for measuring any required property. Advantageously, the apparatus comprises a displacement responsive transducer that includes at least the first impedance element, wherein the first impedance of the first impedance element varies with displacement of a part of the displacement responsive transducer. As mentioned above, if a differential transducer is provided the second impedance may also vary (e.g. in an opposite sense to the first impedance) with displacement of the part of the displacement responsive transducer.

The present invention can also provide multi-channel or multiplexed operation. Advantageously, the apparatus may thus comprise a third impedance element that has a third impedance that varies with a second property to be measured and a fourth impedance element having a fourth impedance. The fourth impedance may also vary with the second property to be measured or may be invariant therewith. Advantageously, the drive signal generator applies a third alternating drive signal to the third impedance element and a fourth alternating drive signal to the fourth impedance element. Advantageously, the analogue-to-digital converter receives a resultant signal also comprising the signals produced by the application of the third and fourth alternating drive signals to the third and fourth impedance elements.

Time and/or frequency multiplexing techniques may be used to allow the impedance properties associated with the first and second impedance elements to be separated from the impedance properties of the third and fourth impedance elements.

To implement frequency multiplexing, the first and second alternating drive signals may have a first frequency and the third and fourth alternating drive signals may have a second (different) frequency. Advantageously, the first and second frequencies are harmonically related, but none of the odd harmonics preferably coincide. The preferred properties (e.g. form, amplitude, relative phases etc) of the first and second alternating drive signals are analogous to the preferred properties of the third and fourth alternating drive signals. In a preferred embodiment, the first and second alternating drive signals may comprise a pair of quadrature phase drive signals of a first frequency (e.g. f) and the third and fourth alternating drive signals may comprise a pair of quadrature phase drive signals of a second frequency (e.g. 2f).

In a frequency multiplexed apparatus, the ADC may receive a resultant signal that, at each point in time, comprises the combination of the signals produced by the application of the first, second, third and fourth drive signals to the first, second, third and fourth impedance elements. Appropriate sets of samples from the ADC may then be analysed to extract separate information related to the first and second impedances and the third and fourth impedances; phase sensitive detection (PSD) may again be used to separate out information from the different frequency channels.

A time multiplexing arrangement may also be implemented. In such a system, a first resultant component signal may be produced by the application of the first and second alternating drive signals to the first and second impedance elements. A second resultant component signal may also be produced by the application of the third and fourth alternating drive signals to the third and fourth impedance elements. The resultant signal received by the ADC may thus be formed from a series of segments that alternately relate to the first and second impedances and the third and fourth impedances. For example, a switch may be provided that applies the first and second resultant component signals to the input of the ADC in turn.

In this manner, multiplexed apparatus can be seen to comprise a first sensor channel comprising the first and second impedance elements and a second sensor channel comprising the third and fourth impedance elements. The first and second sensor channels may thus include first and second transducers for measuring first and second properties. For example, the first and second sensor channels may measure displacement along first and second axes respectively.

Although a two channel implementation is described in detail herein, it should be noted that any level of multiplexing may be implemented. In other words, third, fourth, fifth etc sensor channels may be added as required. For example, the apparatus may comprise at least one further pair of impedance elements, wherein at least one impedance element of each pair has an impedance that varies in relation to a further property to be measured. Each of these further pairs of impedance elements may be driven by further alternating drive signals. The resultant signal received by the ADC may then also include, using time and/or frequency multiplexing as described above, the signals produced by the application of the further drive signals to the further impedance elements.

It can be seen that, unlike prior art closed loop systems in which each sensor channel requires a separate DAC, the present invention allows multiplexing to be performed using a single ADC. It can thus be seen that the present invention offers yet further power saving benefits when used to implement a multiplexing arrangement.

The present invention also provides a dimensional metrology device for use with co-ordinate positioning apparatus (e.g. a machine tool or co-ordinate measuring machine), the device comprising apparatus for digitising an impedance of the type described above. Advantageously, the metrology device is arranged to measure displacement along at least one axis. Conveniently, the metrology device is arranged to measure displacement along at least two, or more preferably three, axes. The metrology device may advantageously comprise a measurement probe or a ball-bar.

According to a second aspect of the present invention, a method for digitising an impedance is provided that comprises the steps of; (i) applying a first alternating drive signal to a first impedance element having a first impedance that varies with a property to be measured and applying a second alternating drive signal to a second impedance element having a second impedance, wherein the first alternating drive signal is phase shifted relative to the second alternating drive signal, (ii) generating a resultant signal by combining the signal produced by the application of the first alternating drive signal to the first impedance element with the signal produced by the application of the second alternating drive signal to the second impedance element, (iii) using an analogue-to-digital converter to digitise the resultant signal to generate sample values, characterised by the step (iv) of producing a sum channel and a difference channel from the sample values, the sum channel comprising a series of values relating to the sum of the first and second impedances and the difference channel comprising a series of values relating to the difference between the first and second impedances.

According to a third aspect of the present invention, a dimensional metrology device for use with co-ordinate positioning apparatus is provided that comprises; a displacement responsive transducer comprising a first impedance element having a first impedance that varies with a displacement to be measured, a second impedance element having a second impedance, a drive signal generator for applying a first alternating drive signal to the first impedance element and a second alternating drive signal to the second impedance element, and an analogue-to-digital converter (ADC) for receiving and digitising a resultant signal, the resultant signal comprising the combination of the signals produced by the application of the first and second alternating drive signals to the first and second impedance elements.

The displacement responsive transducer advantageously comprises a differential transducer comprising the first and second impedance elements, wherein the first impedance and the second impedance both vary with the displacement to be measured. Preferably, the device comprises a third impedance element that has a third impedance that varies with a property to be measured and a fourth impedance element having a fourth impedance, wherein the drive signal generator applies a third alternating drive signal to the third impedance element and a fourth alternating drive signal to the fourth impedance element, wherein the analogue-to-digital converter receives a resultant signal comprising the signals produced by the application of the third and fourth drive signals to the third and fourth impedance elements. Conveniently, the first and second alternating drive signals are quadrature phase square wave signals. The first and second impedance elements advantageously comprise first and second capacitive elements.

According to a fourth aspect of the present invention, an open loop circuit is provided for digitising the output of at least one transducer having a variable impedance, the circuit comprising; a driver for generating first and second alternating drive signals, the first alternating drive signal for application to the first impedance element of an associated transducer and the second alternating drive signal for application to a second impedance element, wherein the circuit comprises an analogue-to-digital converter having an input for receiving a resultant signal produced from the combination of the signals produced when the first and second drive signals are applied to the first and second impedance elements.

Apparatus for digitising an impedance is also described that comprises a first impedance element having a first impedance that varies with a property to be measured, a second impedance element having a second impedance, and a drive signal generator for applying a first alternating drive signal to the first impedance element and a second alternating drive signal to the second impedance element, the apparatus comprising an analogue-to-digital converter (ADC) for receiving and digitising a resultant signal, the resultant signal being produced from the combination of the signals produced by the application of the first and second drive signals to the first and second impedance elements. Such apparatus may additionally include any one or more of the features of the first aspect of the invention that are described herein.

It is important to note that the description of the various components of the apparatus that is contained herein is not intended to limit the manner in which the invention is practically implemented. For example, the various components of the apparatus mentioned above for generating and analysing signals may be provided using discrete circuit elements and/or may be implemented using appropriately programmed software and/or hardware based devices. For example, signal generation and/or analysis may be performed using a field programmable gate array (FPGA), a digital signal processor (DSP) or using an appropriately programmed processor. The skilled person would be well aware of the various different options that are available for practical implementation of the invention.

Figure 2:
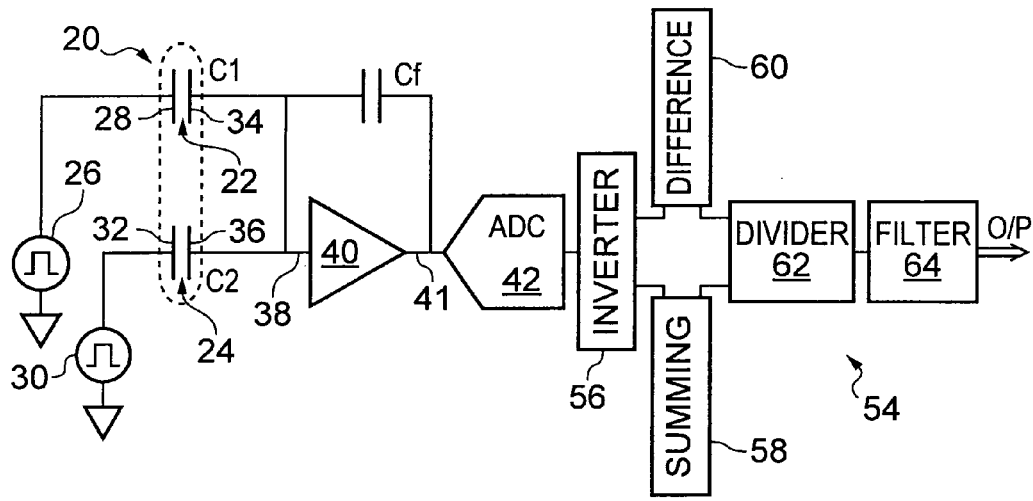
Figure 3:
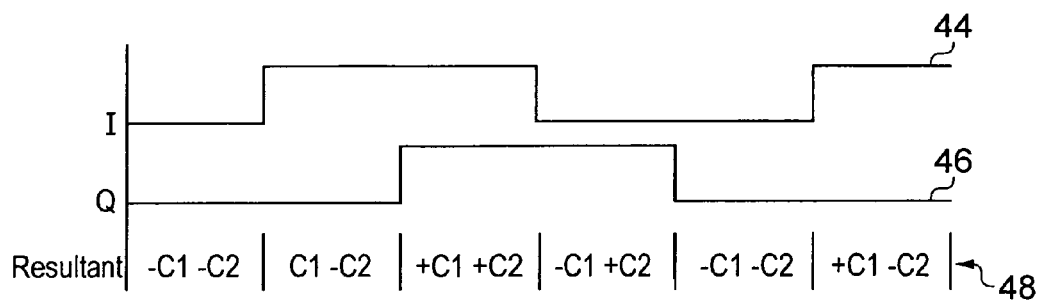
Figure 4:
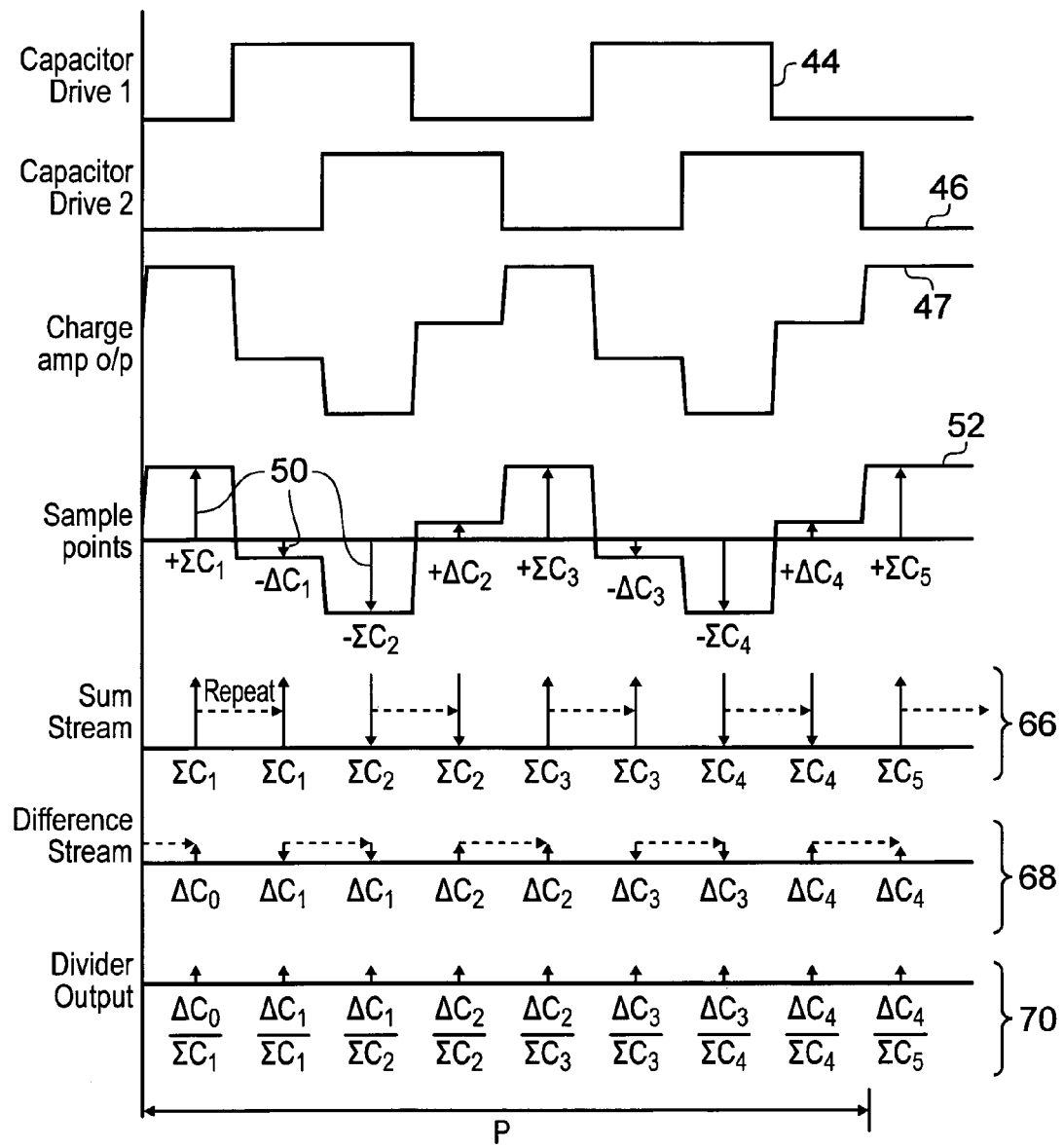
Figure 5:
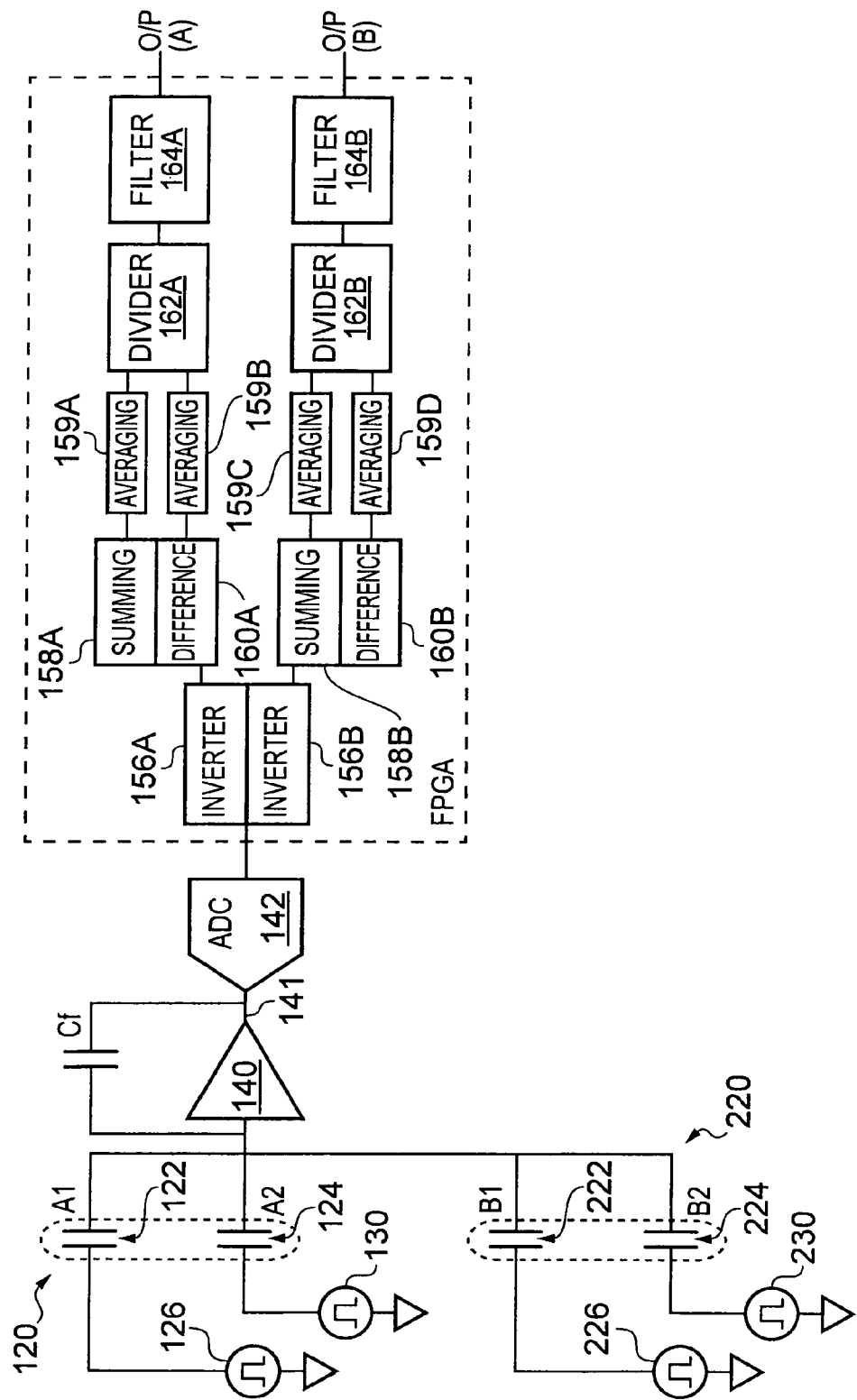
Figure 6:
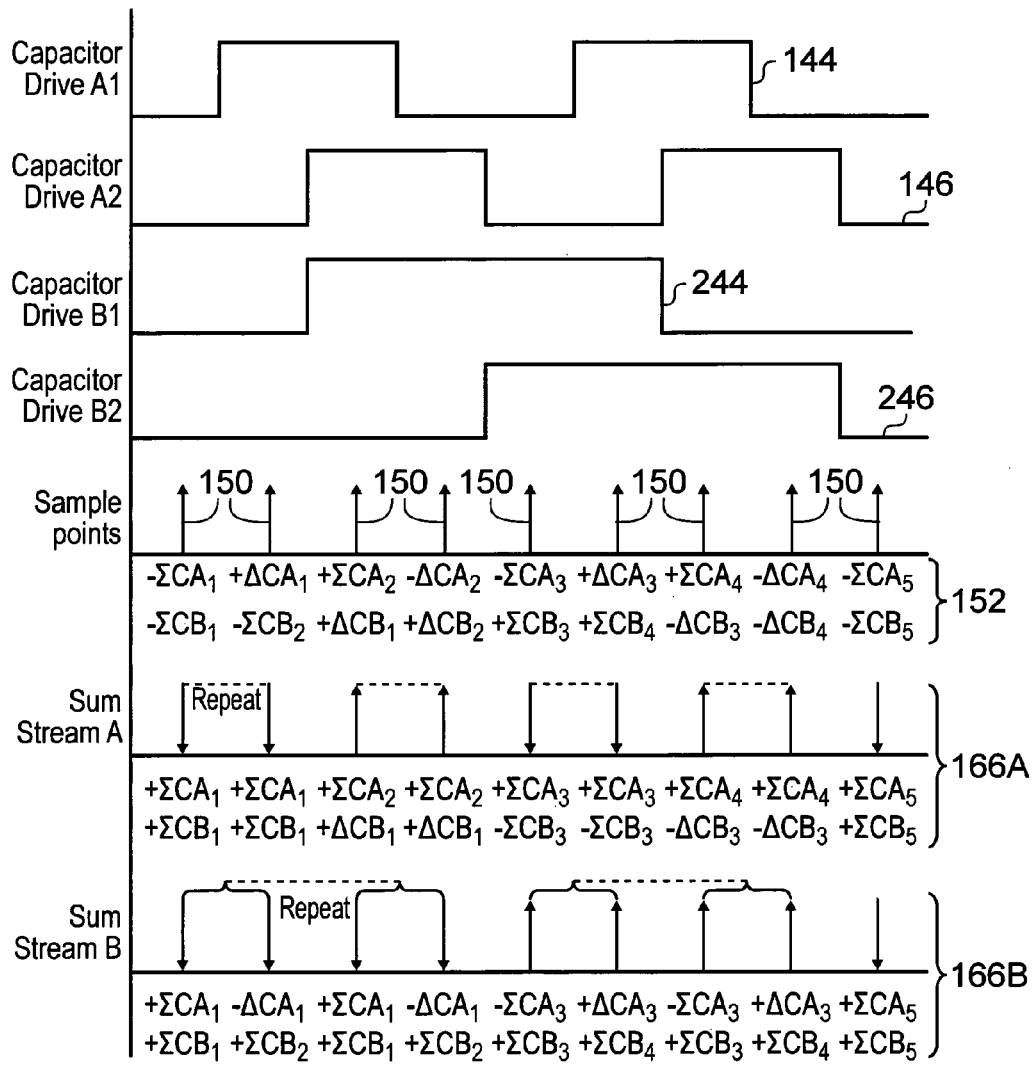
Figure 7:
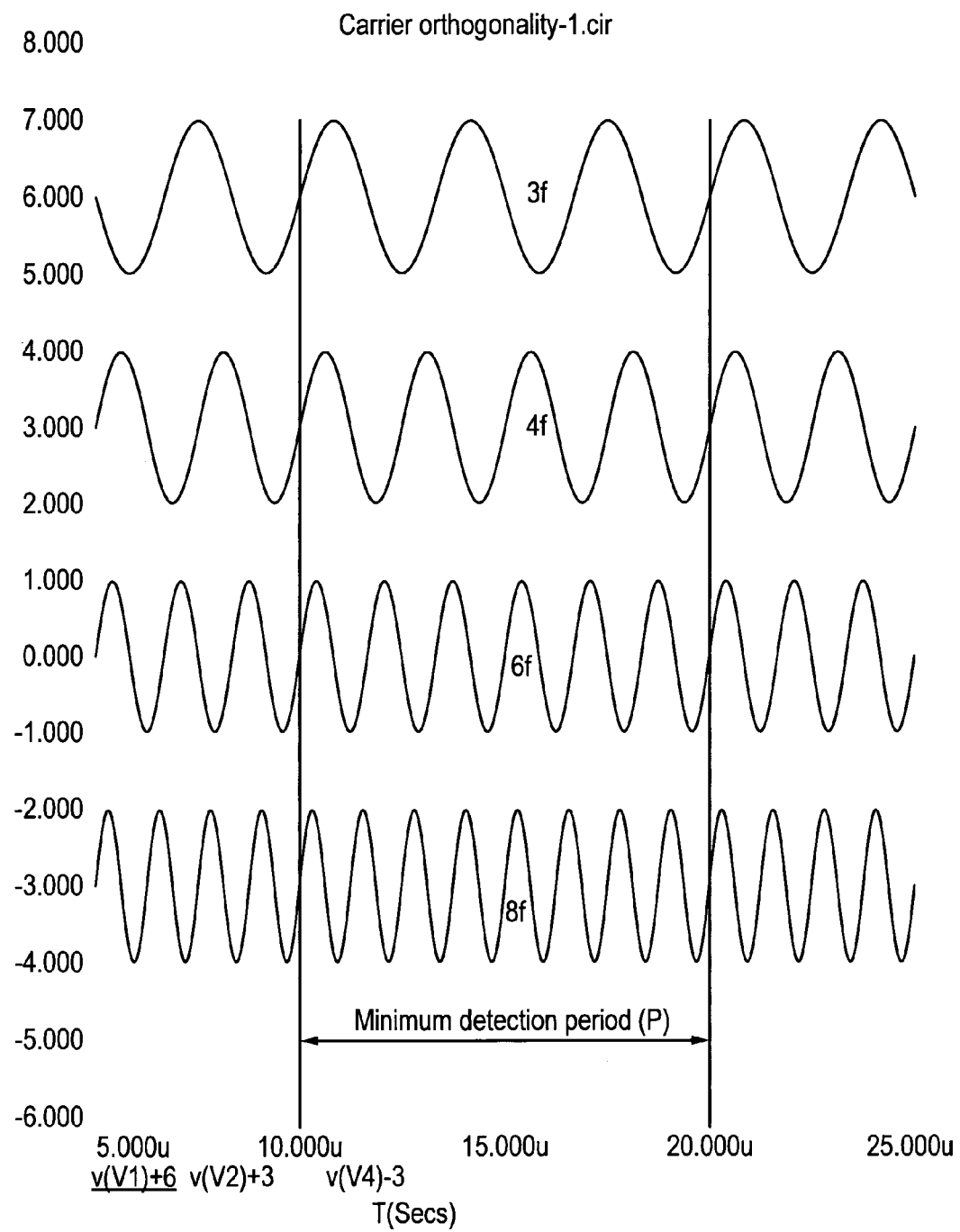

The invention will now be described, by way of example only, with reference to the accompanying drawings in which;

FIG. 1 is a block diagram illustrating the general principle of operation of a prior art closed loop feedback circuit for digitising a differential capacitance transducer, FIG. 2 illustrates an open loop circuit of the present invention for digitising a differential capacitance transducer, FIG. 3 illustrates the drive and resultant signals of the circuit of FIG. 2, FIG. 4 illustrates the process of sample folding, FIG. 5 illustrates an open loop circuit of the present invention for digitising a pair of differential capacitance transducers, FIG. 6 illustrates the various signals of the circuit of FIG. 5, and FIG. 7 shows a suitable set of orthogonal drive signals.

Referring to FIG. 1, a simplified block diagram is provided to illustrate the principle of operation behind prior art apparatus of the type described in WO89/09927 that digitises the capacitance of a differential capacitive transducer using a closed loop or feedback circuit.

The differential capacitive transducer 2 comprises a common plate 4, a first drive plate 6 and a second drive plate 8. There thus exists a first capacitance C1 and a second capacitance C2 between the common plate and the first and second drive plates 6 and 8 respectively. In use, the first and second drive plates of the transducer can be displaced relative to the common plate 4 thereby altering the capacitances C1 and C2. The variation in capacitances C1 and C2 provides a measure of transducer displacement along an axis.

To measure the capacitances C1 and C2, a modulator device 10 applies a square wave to the first drive plate 6 and an inverted square wave to the second drive plate 8. The square wave and inverted square wave have amplitudes $+V_{ref}$ and $-V_{ref}$ respectively and are both offset by a DC feedback voltage $V_F$.

The resultant signal at the common plate 4 is received and amplified by a charge amplifier 12. The charge amplifier 12 thus outputs a resultant voltage signal $V_{res}$ that is related to any imbalance in current between the two driven capacitances C1 and C2 of the differential capacitive transducer 2.

The resultant voltage signal $V_{res}$ is passed to a counter device 14 that has a digital output 16. The digital output 16 is also passed to a digital-to-analogue converter (DAC) 18 and converted into the analogue DC feedback voltage signal $V_F$ that is fed back to the modulator device 10.

The counter device 14 uses the resultant voltage signal $V_{res}$ it receives to increase or decrease the value of the digital output in such a manner that the resultant voltage signal $V_{res}$ tends to zero thereby reducing any imbalance in the current associated with the two driven capacitances C1 and C2. A closed loop feedback system is provided in which the digital output 16 is proportional to the ratio of C1−C2 to C1+C2; this ratio is, in turn, proportional to the displacement of the first and second drive plates of the transducer relative to the common plate 4.

It should be noted that the above is a simplified description of the principles of the closed loop circuitry described in WO89/09927. It should further be noted that multi-channel systems based on the same principles outlined above are also described in detail in WO89/09927. More information on differential transducers suitable for inclusion in measurement probes can also be found in WO02/061378. The contents of WO89/09927 and WO02/061378, in particular the description of the differential transducers found therein, are incorporated herein by reference.

Although closed loop systems of the type described above typically perform adequately, the present inventors have found that they do suffer from a number of significant drawbacks. For example, DACs are typically quite power hungry and can act as a considerable power drain in battery operated apparatus; this is especially the case for multiplexed systems that require one DAC per transducer channel. Furthermore, closed loop systems require a certain time interval to settle down after being powered-up thereby reducing the possibility to make power savings by shutting down the circuitry during periods in which no measurements need to be acquired.

Referring to FIGS. 2 to 4, an open loop circuit for digitising capacitance in accordance with the present invention will be described. In particular, FIG. 2 illustrates the circuit layout whilst FIGS. 3 and 4 illustrate the various signals generated by the circuit in use.

As shown in FIG. 2, the circuit comprises a differential capacitive transducer 20 having first and second capacitive elements 22 and 24 of capacitances C1 and C2 respectively. The differential capacitive transducer 20 may be of the known type mentioned above; for example, it may be a displacement responsive transducer of a measurement probe.

A drive signal generator is provided that includes a first drive signal generator portion 26 and a second drive signal generator portion 30. The first drive signal generator portion 26 applies a first square wave drive signal to a drive plate 28 of the first capacitive element 22. The second drive signal generator portion 30 applies a second square wave drive signal to a drive plate 32 of the second capacitive element 24. The first and second square wave drive signal comprise a pair of quadrature phase square wave signals. In other words, the second square wave drive signal is phase shifted by approximately 90° from the first square wave drive signal.

Pick-up plates 34 and 36 of the first and second capacitive elements 22 and 24 are both connected to the common input 38 of a charge amplifier 40. A resultant signal 41 is output from the charge amplifier 40 and passed to an analogue-to-digital converter or ADC 42. A feedback capacitance $C_f$ is also provided between the charge amplifier's output and input.

As mentioned above, the first and second square wave drive signals used to drive capacitances C1 and C2 are quadrature phase signals. The use of quadrature phase signals is preferred, but by no means essential, as it minimises the effects of DC offsets and other such errors (e.g. carrier amplitude differences) in the charge amplifier 40 and ADC 42. FIGS. 3 and 4 illustrate the in-phase (I) signal 44 that is applied to the first capacitive element 22 and the quadrature phase (Q) signal 46 that is applied to the second capacitive element 24. This quadrature driving of capacitances C1 and C2 produces a resultant (voltage) signal 41 at the output of the charge amplifier 40 that includes a series of alternating negative and positive sums and differences of the capacitances C1 and C2. An example of the resultant signal 41 output by the charge amplifier 40 is illustrated as waveform 47 in FIG. 4. The capacitance information provided by these sum and difference values are generally illustrated by the data stream 48 shown in FIG. 3.

The ADC 42 is arranged to sample the resultant signal 41 that it receives from the charge amplifier 40. An example of the sample points used by the ADC 42 are indicated in FIG. 4 by the arrows 50 located relative to the representation 52 of the resultant signal 41.

As illustrated in FIG. 4, it can be seen that the sample points relate to a series of alternating sums and differences. In particular, the resultant signal representation 52 of FIG. 4 shows a sequence of data values output by the ADC. The sequence comprises a first sum value ($+\Sigma C_1$), a first difference value ($-\Delta C_1$), a second sum value ($-\Sigma C_2$), a second difference value ($+\Delta C_2$), a third sum value ($+\Sigma C_3$), a third difference value ($-\Delta C_3$), a fourth sum value ($-\Sigma C_4$), a fourth difference value ($+\Delta C_4$) and a fifth sum value ($+\Sigma C_5$). It should be noted that the alternating signs of the sum and difference values is arbitrary and has no effect on the information contained in such signals.

Referring again to FIG. 2, the stream of sampled point values generated by the ADC 42 is passed to signal analysis circuitry 54. The signal analysis circuitry 54 is formed using a field programmable gated array (FPGA) in the present embodiment, although it should be recognised that it may be implemented in any other suitable manner (e.g. using a DSP or a suitably programmed micro-processor). The signal analysis circuitry 54 includes a quadrature sensitive inverter 56 that is arranged to invert and separate the alternating sequence of sum and difference values into a sum stream 58 and a difference stream 60. The combination of the ADC 42 and the quadrature sensitive inverter 56 performs a phase sensitive detection function. A divider 62 is provided to divide the difference stream 60 into the sum stream 58. The divider 62 thus generates a series of output values that each describe the ratio of the difference between the capacitances (C1−C2) to the sum of the capacitances (C1+C2).

The output of the divider 62 is passed to a digital filter 64 (noting that the digital filter may alternatively be located before the divider). In this example, the digital filter 64 is of the finite impulse response (FIR) type to enable fast signal acquisition. The digital filter 64 is based on a raised cosine function; such a function is relatively simple to implement and guarantees zero overshoot to a step change. Furthermore, changing the value of "n" allows the frequency response and stop band attenuation to be readily controlled. In this example, the digital filter 64 is arranged to have a stop band attenuation of 100 dB for a resolution of 20 bits. The digital filter 64 also introduces a minimal delay; minimising the filter delay in this manner ensures the latency in the response of the transducer system is minimised (which is often important for displacement sensitive transducer systems such as measurement probes) and also reduces the complexity of the logic design. It should also be noted that the signal acquisition time is also set by the number of samples or taps it takes to fill the digital filter 64, after this all readings are valid. The digital filter 64 of the present example has 15 or 25 taps. The digital filter 64 also increases the resolution of the system by producing a running average of the signal and also sets the system bandwidth.

The digital filter 64 described above is designed to receive a continuous stream of values from the divider 62. This continuous stream of values is achieved by repeating some of the sum and difference outputs; the sampling rate is thus maintained and information loss minimised by folding the divisions. In particular, the sum stream 58 as illustrated in the representation 66 of FIG. 4 comprises a sum value at each ADC sample point. This is achieved by repeating each sum value in the subsequent sample point (i.e. where no new sum value is yet available). Similarly, the difference stream 60 as illustrated in the representation 68 of FIG. 4 comprises a different value at each ADC sample point which is again achieved by repeating each difference value in the subsequent sample point. It should also be noted that in the representations 66 and 68 of FIG. 4, down arrows indicate inverted samples whereas up arrows indicate non-inverted samples.

The divider 62 thus receives sum and difference streams that are both formed using repeated samples, but every division is unique. A representation 70 of the divider output is also provided in FIG. 4. The continuous stream of output values from the divider 62 is also in a format that can be readily received and acted upon by the digital filter 64.

It is noted that any DC offset errors will result in a zero shift and a scale factor change that both average out over every four samples. Although FIR digital filters of the type mentioned above have an odd number of taps, they still greatly reduce such errors. For example, a 15 tap filter reduces the errors by more than two orders of magnitude. The 1.6 mV or 20 bit error of a typical 16 bit ADC can thus be reduced to less than 1 bit in 18.

It should be noted that the divider 62 may be configured to implement other, possibly more complex, division regimes. For example, the more complex regime outlined in expression (1) below can be used; this scheme completely removes any potential DC offset errors whilst also maintaining the sample rate and producing unique divisions.

$$\ldots \frac{\Sigma C_1 - \Sigma C_2}{-\Delta C_1 + \Delta C_2}, \frac{\Sigma C_3 - \Sigma C_2}{-\Delta C_1 + \Delta C_2}, \frac{\Sigma C_3 - \Sigma C_2}{-\Delta C_3 + \Delta C_2}, \qquad (1)$$
$$\frac{\Sigma C_3 - \Sigma C_4}{-\Delta C_3 + \Delta C_2}, \frac{\Sigma C_3 - \Sigma C_4}{-\Delta C_3 + \Delta C_4} \ldots$$

Another potential source of error in the open loop circuit of the present invention arises from variations in the amplitude of the quadrature phase signals. In particular, it has been found that carrier amplitude variations cause an error that is proportional to:

$$\left[\frac{C1 - C2}{C1 + C2}\right]^2 * e/2 \qquad (2)$$

where e is the fractional difference between the amplitudes. Carrier amplitude variations of this type are not significantly reduced by averaging in the digital filter, but can be removed by a calibration process. Unless the two carrier amplitudes then track with time and temperature, the calibration process may need to be repeated. For example, calibration may be maintained by using the ADC to monitor the amplitude of the carriers using an internal calibration cycle. Square wave signals for driving the capacitances are used in the present example because it is easier to produce quadrature phase signal carriers of identical amplitudes and because they are easier to sample. It is, however, important to note that other types of waveform (e.g. sinusoidal or triangular waveforms) could be used.

It should be noted that one sample point per drive quadrant is illustrated in FIG. 4; this is the minimum number of sample points that can be used and is also the simplest. It would, however, be possible to sample at a higher rate which, when optionally combined with appropriate digital filtering, can increase the resolution attainable beyond that of the resolution of the ADC 42. It should also be noted that over-sampling in this manner also requires any interleaving of sum/difference values to be appropriately adjusted; e.g. to still provide unique divisions.

Although the open loop configuration of the present invention increases the complexity of the digital signal processing that is required, this has been found to be more than outweighed by other benefits. For example, an advantage of the technique of the present invention over prior art systems of the type described with reference to FIG. 1 is the elimination of the DAC with a consequent power saving and noise reduction. An ADC typically also has better linearity than a DAC. Furthermore, closed loop systems always require a certain amount of time after switch-on before they follow the input signal faithfully (i.e. to allow loop settling). In contrast, the open loop system of the present invention can be operated on demand (i.e. a reading is valid as soon as the filter is filled; e.g. after the 15 or 25 samples) thereby saving even more power. In addition, the present invention permits the use of higher drive voltages thereby further improving the signal-to-noise ratio and the resolution of the system can also be easily improved by up-rating the ADC.

It should also be noted that the open loop arrangement of the present invention does not necessarily have to be implemented using the high speed, folded or interleaved, approach that is described above. If a slower rate of output values from the apparatus is acceptable, a lower complexity (e.g. decimation sampling) analysis could be performed on the sum and difference values generated by the ADC. For example, sets of four adjacent sum/difference values could be collected and an average sum/difference ratio subsequently calculated therefrom. In other words, the various ADC samples could be stored and processed in slower time to obtain a output values indicating an impedance sum/difference ratio. This simpler, but slower, technique would also remove the need for a relatively high power consumption FIR filter or the like.

Referring to FIGS. 5 and 6, a further embodiment of the invention will now be described for multiplexing multiple transducers into a single charge amplifier and ADC.

The circuit shown in FIG. 5 comprises a first differential capacitive transducer 120 and a second differential capacitive transducer 220. The first differential capacitive transducer 120 comprises first and second capacitive elements 122 and 124 of capacitances A1 and A2. The second differential capacitive transducer 220 comprises third and fourth capacitive elements 222 and 224 of capacitances B1 and B2. A drive signal generator is also provided having first, second, third and fourth drive signal portions 126, 130, 226 and 230 for applying square waves to the first, second, third and fourth capacitive elements 122, 124, 222 and 224 respectively.

A signal derived from applying the drive signals to the first, second, third and fourth capacitive elements 122, 124, 222 and 224 is fed to the common input 138 of a charge amplifier 140. A resultant signal 141 is output from the charge amplifier 140 and passed to an ADC 142. A feedback capacitance $C_f$ is also provided between the charge amplifier's output and input.

The multiplexing circuit of FIG. 5 can thus be seen to feed signals from each of the four capacitive element into a single charge amplifier 140. This produces some additional noise compared to feeding the charge amplifier 140 with signals from only two capacitive elements, but such an effect can be made to be negligible. Although a single charge amplifier is shown in FIG. 5, it would alternatively be possible to include a separate charge amplifier for each transducer. Resultant component signals from each charge amplifier may be applied to the input of the ADC in parallel or each resultant component signal may be applied to the ADC in turn.

FIG. 6 illustrates the first and second, quadrature phase, square wave drive signals 144 and 146 of a first frequency 2f that are applied to the first and second capacitive elements 122 and 124 respectively. Also shown in FIG. 6 are the third and fourth, quadrature phase, square wave drive signals 244 and 246 of a second, lower, frequency f that are applied to the third and fourth capacitive elements 222 and 224 respectively.

The resultant signal 141 generated by the charge amplifier 140 is passed to, and sampled by, the ADC 142.

The ADC 142 is arranged to take a sample at each quarter period of the highest frequency (2f) square wave. The ADC sample points are illustrated in FIG. 6 by arrows 150 and also shown is the stream or sequence of sampled values 152 generated by the ADC 142. The sequence of sampled values 152 comprises a first sampled value resulting from the combination of the first (negative) sum of the A1 and A2 capacitances (termed $-\Sigma CA_1$) with the first (negative) sum of the B1 and B2 capacitances (termed $-\Sigma CB_1$). The second sampled value results from the combination of the first (positive) difference between the A1 and A2 capacitances ($+\Delta CA_1$) with the second (negative) sum of the B1 and B2 capacitances ($-\Sigma CB_2$). The third sampled value results from the combination of the second (positive) sum of the A1 and A2 capacitances ($+\Sigma CA_2$) with the first (positive) difference between the B1 and B2 capacitances ($+\Delta CB_1$). This pattern continues as shown in FIG. 6.

It should be noted that a multiplexing arrangement of this type has an effect on the dynamic range of the ADC compared with a non-multiplexed system. For the single transducer circuit described above with reference to FIG. 2, the amplitudes of the square wave drive voltages and the feedback capacitance $C_f$ are selected so that the ADC is driven close to minimum for +C1+C2 and close to maximum for −C1−C2. If more than one carrier is used, the ADC preferably does not saturate for the positive, negative, or sum of sums resultant signals. If there are two carriers, the effective range of the ADC will drop to a half of full scale. If there are three carriers, the effective range of the ADC will drop to one third of full scale which would mean a 16 bit ADC will be reduced to 14.4 bits of useful range. To recover the lost range, the sampling rate may be raised and/or the ADC resolution increased.

A pair of quadrature sensitive inverters 156A and 156B are provided to split the ADC samples into a sum stream 158A and a difference stream 160A for the first transducer 120 (channel A) and also into a sum stream 158B and a difference stream 160B for the second transducer 220 (channel B). These quadrature sensitive inverters 156A and 156B provide the splitting function by also receiving the first, second, third and fourth square wave drive signals (or signals derived therefrom) and implementing a phase sensitive detection based separation process. Each of the four sum and difference streams 158A, 160A, 158B and 160B are then fed to a respective one of the averaging units 159A-159D. The averaging units 159A-159D average each of the streams over a time period or cycle time P; the cycle time P being set, as described below, to a value that removes the contribution of signals from channel A to channel B and vice versa.

FIG. 6 also includes a first representation 166A of the values contained in the sum stream for channel A and a second representation 166B of the sum stream for channel B. To provide a continuous stream of data bits, a single repeat is provided for the higher frequency (channel A) carrier and a double repeat pattern is used for the slower (channel B) carrier. Although only the sum streams are shown in FIG. 6, the difference streams 160A and 160B are formed in an analogous manner. It is also important to again note that, over one cycle, the sum and difference components from the second transducer (i.e. channel B) add to zero in the sum and difference streams of channel A. Similarly, over one cycle, the sum and difference components from the first transducer add to zero in the sum and difference streams of channel B.

The (averaged) sum and difference streams for channel A are passed to a first divider 162A and first digital filter 164A to generate a first digital output.

Similarly, the (averaged) sum and difference streams for channel B are passed to a second divider 162B and second digital filter 164B to generate a second digital output. The first and second digital outputs thus relate to the capacitance values of the first and second differential capacitive transducers 120 and 220 respectively.

Transducer multiplexing of the type described herein can be used to save both power and the number of electronic components required for a multiple transducer system. For example, charge amplifiers are normally complex circuits comprising one or more relatively expensive and power hungry amplifier components. Similarly, an ADC is also a relatively expensive and power hungry component. A multiplexing arrangement can thus be used to greatly reduce the cost and complexity of a multiple transducer system.

Although the above example demonstrates multiplexing two differential capacitive transducers using two square wave carriers of frequency f and 2f, it should be noted that higher orders of multiplexing could be employed. For example, the signals from further (e.g. third, fourth, fifth etc) differential capacitive transducers could be fed into the common input of the charge amplifier 140. In order to multiplex in such a manner, the different carriers applied to each of the differential capacitive transducers of the various channels are preferably orthogonal. For systems that use phase sensitive detection, orthogonality can be ensured if the frequencies are harmonically related and none of the odd harmonics coincide. A few examples of suitable orthogonal sets are listed in table 1 below.

TABLE 1

Examples of orthogonal quadrature carrier sets

| Sequence | Minimum ADC sampling rate |
| --- | --- |
| 1f, 2f, 4f, 8f . . . | Four the highest frequency (e.g. 32f) |
| 2f, 3f, 4f. | Twelve times the highest frequency (48f) |
| 3f, 4f, 6f. | Eight times the highest frequency (48f) |
| 3f, 4f, 6f, 8f. | Twelve times the highest frequency (96f) |

Also listed in table 1 is the preferred minimum sampling rate of the ADC for each of the specified carrier sets. The indicated minimum sampling rate is the first multiple to guarantee that, for each of the frequencies, each carrier half cycle has an equal number of samples. For example, in the 3f, 4f, 6f, 8f sequence outlined in table 1 above, the 3f carrier comprises 16 samples per half cycle and the 8f carrier comprises 6 samples per half cycle. The indicated multiple also sets the minimum accumulation (or integration) time period (P); e.g. the averaging time used by the averaging units 159A-159D described above. Accumulating or integrating for this number of samples, e.g. before the division of sum and difference values, ensures that the unwanted frequencies sum to zero.

Referring to FIG. 7, an orthogonal carrier set 3f, 4f, 6f, 8f is illustrated using sine wave carriers as an example. Also shown in FIG. 7 is the minimum detection or averaging period (P) in which all carriers have an integer number of cycles. Use of such an averaging period (P) ensures that the signal components from different frequency channels can be substantially separated from one another using phase sensitive detection as described above.

Although frequency division multiplexing is described above, the present invention could also be implemented using time division multiplexing. In such an example, each transducer could be driven with a single I-Q pulse sequence in turn. It would then still be possible to use a single charge amplifier and ADC without any dynamic range reduction or averaging filter requirement; the signal-to-noise ratio would, however, be reduced instead by the extra stray capacitances from the passive transducers.

The above examples are related to differential capacitive transducers that have two capacitance values (e.g. C1 and C2) that vary together in relation to a quantity (e.g. displacement) that is being measured. The invention can, however, also be applied to single ended capacitance sensors. For example, a capacitance sensor may be used that has a single capacitance (e.g. C1) that varies in relation to the property being measured. In such an example, a second capacitance (e.g. a fixed capacitance C2) may be employed in place of the variable capacitance.

Although the above examples describe capacitive based systems, it is also important to note that the invention can be used to digitise any impedance. For example, the skilled person would appreciate how the principles outlined above can also be applied (with a few minor changes to the required circuitry) to resistive or inductive transducers.

The invention claimed is:

1. An apparatus for digitising an impedance, comprising;
   a first impedance element having a first impedance that varies with a property to be measured;
   a second impedance element having a second impedance;
   a drive signal generator configured to apply a first alternating drive signal to the first impedance element and a second alternating drive signal to the second impedance element; and
   an analogue-to-digital converter (ADC) configured to receive and digitise a resultant signal, the resultant signal comprising a combination of signals produced by the application of the first and second alternating drive signals to the first and second impedance elements,
   wherein the first alternating drive signal is phase shifted relative to the second alternating drive signal such that the resultant signal received and sampled by the analogue-to-digital converter sequentially relates to the sum of, and the difference between, the first and second impedances,
   wherein the apparatus comprises a signal separator that receives sample values from the ADC and provides a sum channel and a difference channel, the sum channel comprising a series of values relating to the sum of the first and second impedances and the difference channel comprising a series of values relating to the difference between the first and second impedances, and
   wherein the apparatus further comprises a divider, the divider dividing values in the difference channel by values in the sum channel to thereby produce a stream of output values, and the output values relating to the ratio of the difference between the first and second impedances and the sum of the first and second impedances.

2. The apparatus according to claim 1, further comprising at least one digital filter.

3. The apparatus according to claim 1, wherein the first and second alternating drive signals are quadrature phase square wave signals.

4. The apparatus according to claim 1, further comprising a differential transducer that includes the first and second impedance elements,
   wherein both the first impedance and the second impedance vary with the property to be measured.

5. The apparatus according to claim 1, further comprising a transducer that includes the first impedance element, wherein the second impedance measured by the second impedance element is invariant with the property to be measured by the transducer.

6. The apparatus according to claim 1, wherein the first and second impedance elements comprise first and second capacitive elements.

7. The apparatus according to claim 1, further comprising a charge amplifier,
wherein the charge amplifier has a common input configured to receive a signal from each of the first and second impedance elements and produce the resultant signal that is supplied to the analogue-to-digital converter.

8. The apparatus according to claim 1, further comprising a displacement responsive transducer that includes at least the first impedance element,
wherein the first impedance of the first impedance element varies with displacement of a part of the displacement responsive transducer.

9. The apparatus according to claim 1, further comprising:
a third impedance element that has a third impedance that varies with a property to be measured; and
a fourth impedance element having a fourth impedance,
wherein the drive signal generator applies a third alternating drive signal to the third impedance element and a fourth alternating drive signal to the fourth impedance element.

10. The apparatus according to claim 9, wherein the analogue-to-digital converter receives a resultant signal comprising signals produced by the application of the third and fourth drive signals to the third and fourth impedance elements.

11. The apparatus according to claim 9, wherein the first and second alternating drive signals have a first frequency and the third and fourth alternating drive signals have a second frequency.

12. A dimensional metrology device for use with a co-ordinate positioning apparatus, the device comprising the apparatus for digitising an impedance according to claim 1.

13. A method for digitising an impedance, the method comprising the steps of;
(i) applying a first alternating drive signal to a first impedance element having a first impedance that varies with a property to be measured and applying a second alternating drive signal to a second impedance element having a second impedance, wherein the first alternating drive signal is phase shifted relative to the second alternating drive signal;
(ii) generating a resultant signal by combining a signal produced by the application of the first alternating drive signal to the first impedance element with a signal produced by the application of the second alternating drive signal to the second impedance element;
(iii) using an analogue-to-digital converter to digitise the resultant signal to generate sample values;
(iv) producing a sum channel and a difference channel from the sample values, the sum channel comprising a series of values relating to the sum of the first and second impedances and the difference channel comprising a series of values relating to the difference between the first and second impedances; and
(v) dividing values in the difference channel by values in the sum channel to thereby produce a stream of output values, the output values relating to the ratio of the difference between the first and second impedances and the sum of the first and second impedances.

\* \* \* \* \*